Sept. 18, 1962     G. H. RÖHM     3,054,207
REVOLVER WITH MOUNTING MEANS FOR THE
BEARING PIN OF THE CYLINDER
Filed May 20, 1960

INVENTOR

Günter H. Röhm

3,054,207
REVOLVER WITH MOUNTING MEANS FOR THE BEARING PIN OF THE CYLINDER

Günter Horst Röhm, Muhlstrasse 9,
Sontheim (Brenz), Germany
Filed May 20, 1960, Ser. No. 30,649
Claims priority, application Germany May 27, 1959
4 Claims. (Cl. 42—62)

The present invention relates to a revolver having a die-cast frame consisting, for example, of a zinc alloy and a revolving cylinder which is rotatably mounted on a steel bearing pin and pivotable out of the frame about another pin which is secured to the frame.

It is known in the art of hand firearms with die-cast frames to provide those points which are subjected to impacts or friction with cast-in steel reinforcements which, however, have the disadvantage that, due to the strong concussions and impacts of the firing, they may work loose from the frame. Furthermore, such inserts render the production of the die-cast frames more difficult and expensive.

In any revolver in which the cartridge cylinder is pivotable outwardly of the frame and rotatable about a bearing pin which may also be connected to the cartridge extractor, the bearing for this pin in the frame as well as the walls of the slot through which the pin with the cartridge cylinder thereon is pivoted into or out of the bearing are subjected to friction and to severe impacts during firing so that especially the seat of the bearing pin in the frame will become enlarged after a certain period of use of the revolver since this seat is subjected not only to friction when the pin is being pulled out and unseated but since at every shot it must also take up the strong impact which is transmitted from the cylinder through the bearing pin to the frame. An accurate and solid seat of the bearing pin is, however, of the greatest importance since it also determines the proper position of the cylinder and each chamber therein relative to the bore of the barrel which is mounted on the frame.

It is an object of the invention to provide a reinforcement for the seat of the bearing pin of the cylinder in the form of an insert consisting of steel or other hard metal which is secured in a fixed position by the barrel when the latter is screwed into the frame.

The reinforcing insert may consist of a double ring with a closed part and a slotted part. The closed part of this double ring is disposed between a shoulder on the barrel and the frame, and the slotted part covers the end surface of the recess for the bearing pin of the cylinder and forms the actual seat for this pin, while the edges of the slot in this part form bearing surfaces to support the bearing pin when the cylinder is being pivoted outwardly or inwardly of its bearing.

The double ring is preferably inserted into a recess of a corresponding shape in the front end of the frame so as to be secured against any lateral displacement. The bearing pin is thus provided with an accurate solid seat which will not be displaced or enlarged by the operation and firing of the revolver.

For the same purpose, the reinforcing insert may, according to another embodiment of the invention, also consist of a slotted bushing of hard metal, for example, steel, which is fitted into the aperture for the bearing pin of the cylinder and the end surface of which engages with and is secured by a shoulder on the barrel. The reinforcing insert may also be secured to the frame by any other suitable means, although it is preferable to secure it by means of the barrel since no other securing means will then be required.

The frame is die-cast and consists of a soft metal. While the term soft metal would include as specific examples zinc alloys such as zinc-aluminum alloy, the term is meant to include every metal or metal alloy which is suitable for injection molding or pressure casting. As a result of their suitability for the less expensive metal flowing processes, the metals or alloys have a lower melting point and are softer than the hard metals, such as steel, which require more expensive forming processes. One skilled in the art can easily delineate between the soft metals which require reinforcement, and hard metals which are used to reinforce or need no reinforcement.

These and other objects, features, and advantages of the present invention will become further apparent from the following detailed description thereof, particularly when the same is read with reference to the accompanying drawings, in which—

FIGURE 2 shows a plan view of the double ring; while

Figure 1:
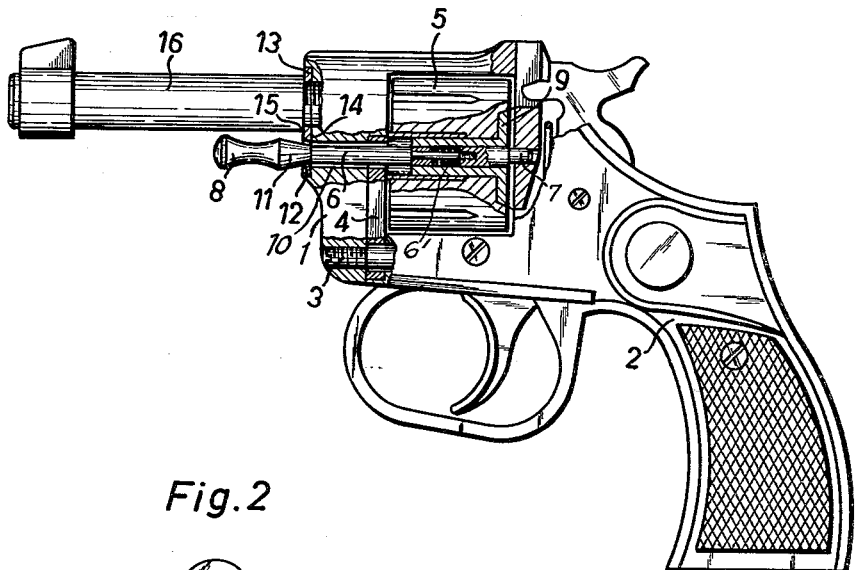
FIGURE 1 shows a side view, partly in cross section, of a revolver according to the invention.
Figure 2:
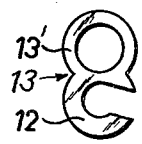

Referring first particularly to FIGURE 1 of the drawings, the frame 1 of the revolver including its grip portion 2 is die-cast and therefore consists of a relatively soft metal. Frame 1 contains a pin 3 on which the supporting bracket 4 for the cylinder 5 is pivotably mounted so as to form a lever. This bracket 4 has a bearing pin inserted therein which consists of two parts 6 and 7 which are separated by a spring 6'. Part 6 carries on its outer end a handle portion 8, while part 7 is connected to the cartridge extractor 9. Part 6 of the bearing pin behind the handle portion 8 is inserted into a slotted bearing portion 10 in frame 1, and a conical portion 11 of bearing pin 6 engages into a slotted part 12 of a double ring 13 which consists of steel or other hard metal and is fitted into a recess 14 in frame 1. The closed part 13' of this double ring is secured in a fixed position by a shoulder 15 on the barrel 16 which is screwed into frame 1.

When the handle portion 8 of pin 6 is pulled forwardly the pin will be disengaged from the slotted ring portion 12 and may then be pivoted laterally together with the supporting bracket 4 of cylinder 5 out of the slotted bearing portion 10 of frame 1.

Figure 3:
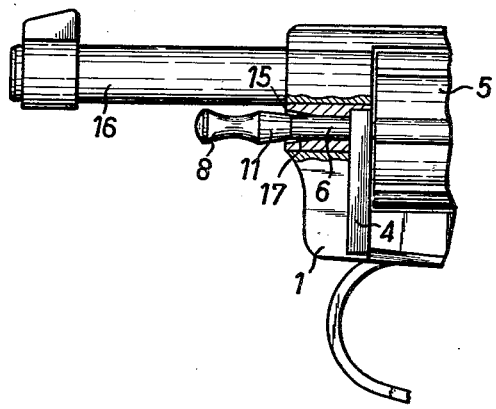
FIGURE 3 shows a side view, partly in cross section, of a modification of the invention.

According to a modification of the invention, as illustrated in FIGURE 3, the reinforcing insert for guiding pin 6 consists of a slotted bushing 17 of steel or other hard metal which is fitted into a recess in frame 1 and is secured in a fixed position by shoulder 15 on barrel 16 engaging against the end surface of the bushing.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a revolver having a die-cast frame, a barrel screwed into said frame, a pin secured to said frame and extending parallel to, but spaced from said barrel, a lever pivotably mounted on said pin and having a bore, a bearing pin slidable within said bore parallel to said barrel and having a front end projecting from said frame to form a handle portion, said frame having a slotted bearing aperture therein for receiving said bearing pin, and a slotted member mounted on the front end of said frame and forming a slotted seat for said front end of said bearing pin and secured by said barrel in a fixed position on said frame, a spring member normally maintaining said bearing pin on said seat, and a cartridge cylinder rotatably mounted on said bearing pin and pivotable together with said bearing pin by said lever into and out of said frame about said first pin when said bearing pin is pulled off said seat against the action of said spring.

2. In a revolver as defined in claim 1, in which said member consists of a double ring having a closed annular part and a slotted annular part, said closed part being secured between a shoulder on said barrel and said frame, said slotted part engaging with the front end of said slotted bearing and forming said seat for said bearing pin, the edges of the slot in said slotted part forming guide surfaces for sliding engagement with said bearing pin when said bearing pin with said cylinder thereon is pivoted into or out of said bearing aperture.

3. A revolver as defined in claim 2, in which the front end of said frame has a recess therein of a shape substantially corresponding to the shape of said double ring, said double ring being inserted into said recess so as to prevent it from shifting laterally relative to said frame.

4. A revolver as defined in claim 1, in which said frame has a mounting aperture therein, said member consisting of a slotted bushing of metal fitted into said mounting aperture and forming said slotted bearing aperture and also said seat, said barrel having a shoulder engaging with an end surface of said bushing for securing the same in a fixed position in said frame.

No references cited.